(12) United States Patent
Hoffmann et al.

(10) Patent No.: US 10,721,580 B1
(45) Date of Patent: Jul. 21, 2020

(54) SUBBAND-BASED AUDIO CALIBRATION

(71) Applicant: Oculus VR, LLC, Menlo Park, CA (US)

(72) Inventors: Pablo Francisco Faundez Hoffmann, Redmond, WA (US); Antonio John Miller, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/052,543

(22) Filed: Aug. 1, 2018

(51) Int. Cl.
*H04S 7/00* (2006.01)
*H04R 5/04* (2006.01)
*G02B 27/01* (2006.01)

(52) U.S. Cl.
CPC .......... *H04S 7/301* (2013.01); *G02B 27/0172* (2013.01); *H04R 5/04* (2013.01); *G02B 2027/014* (2013.01); *G02B 2027/0138* (2013.01); *G02B 2027/0178* (2013.01); *H04R 2400/01* (2013.01); *H04S 2420/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,610,024 A * | 9/1986 | Schulhof | ............... | H03G 5/165 333/28 R |
| 5,388,160 A * | 2/1995 | Hashimoto | ......... | G10K 11/178 381/71.14 |
| 9,812,146 B1 * | 11/2017 | Gejji | .................... | G10L 21/0205 |
| 2008/0137874 A1 * | 6/2008 | Christoph | ............ | H03G 3/3089 381/57 |
| 2008/0181419 A1 * | 7/2008 | Goldstein | .............. | H04R 3/002 381/57 |
| 2009/0116661 A1 * | 5/2009 | Hetherington | .......... | G10L 21/02 381/93 |
| 2010/0215190 A1 * | 8/2010 | Itou | ...................... | G10K 11/178 381/94.2 |
| 2012/0033835 A1 * | 2/2012 | Gough | ..................... | H04R 3/04 381/150 |
| 2013/0188799 A1 * | 7/2013 | Otani | ....................... | H04B 3/20 381/66 |
| 2013/0346073 A1 * | 12/2013 | Laaksonen | .......... | G10L 19/0208 704/226 |
| 2014/0211966 A1 * | 7/2014 | Hetherington | ....... | G10K 11/178 381/94.3 |
| 2017/0041724 A1 * | 2/2017 | Master | .................... | G06F 3/165 |
| 2019/0019508 A1 * | 1/2019 | Rochford | ................ | G10L 15/22 |

* cited by examiner

*Primary Examiner* — Duc Nguyen
*Assistant Examiner* — Assad Mohammed
(74) *Attorney, Agent, or Firm* — Artegis Law Group, LLP (57) ABSTRACT

A technique for subband-based audio calibration includes receiving a first audio signal captured at a microphone and a second audio signal provided to a speaker. The technique continues by synchronizing the second audio signal with the first audio signal to generate a synchronized audio signal and transforming the synchronized audio signal to a first subband representation and the first audio signal to a second subband representation. The technique then includes calculating a transfer function associated with the speaker and the microphone based on the first subband representation and the second subband representation.

23 Claims, 8 Drawing Sheets

```
┌─────────────────────────────────────────────────────────┐
│  DETERMINE A SIGNAL TO NOISE RATIO FOR AN AUDIO SIGNAL  │
│               WITH RESPECT TO AUDIO NOISE                │
│                          610                             │
└─────────────────────────────────────────────────────────┘
                             │
                             ▼
┌─────────────────────────────────────────────────────────┐
│  ESTIMATE A TRANSFER FUNCTION BETWEEN A SPEAKER AND A   │
│  MICROPHONE BASED, AT LEAST IN PART, ON TWO PREVIOUS    │
│    TRANSFER FUNCTIONS BETWEEN THE SPEAKER AND THE       │
│                       MICROPHONE                         │
│                          620                             │
└─────────────────────────────────────────────────────────┘
                             │
                             ▼
┌─────────────────────────────────────────────────────────┐
│  IN AN ITERATIVE PROCESS, UPDATE AN ESTIMATE OF THE     │
│  TRANSFER FUNCTION BETWEEN THE SPEAKER AND THE           │
│  MICROPHONE BASED, AT LEAST IN PART, ON ANOTHER TWO     │
│  PREVIOUS TRANSFER FUNCTIONS BETWEEN THE SPEAKER AND    │
│  THE MICROPHONE, WHEREIN A RATE OF THE ITERATIVE        │
│  PROCESS OF UPDATING THE ESTIMATE OF THE TRANSFER       │
│  FUNCTION DEPENDS, AT LEAST IN PART, ON THE SIGNAL      │
│                      TO NOISE RATIO                      │
│                          630                             │
└─────────────────────────────────────────────────────────┘
```

SUBBAND-BASED AUDIO CALIBRATION

BACKGROUND

Field of the Various Embodiments

The various embodiments relate generally to audio signal processing and, more specifically, to techniques for subband-based audio calibration.

Description of the Related Art

While listening to audio, the quality of sound of original audio playback material, such as for music or voice recordings, depends on the ability of an audio system to produce sound that accurately corresponds to the audio playback material. Dynamics of an audio playback device and the environment in which the device operates generally affect sound quality. For example, the environment and/or inherent frequency response of the audio system may introduce ambient noise.

Generally, an audio playback device is calibrated within the audio environment in which the device operates. The calibration allows for filtering or otherwise addressing the inherent frequency response of the device such that the frequency response does not affect the spectrum (e.g., add "color" to the sound) of the original playback material. In order to be effective, calibration techniques implemented in an audio system need to be computationally efficient and operate consistently over a large variety of audio signals and noise in the environment.

SUMMARY

One embodiment of the disclosure sets forth a technique, which may be computer-implemented, for subband-based audio calibration. The technique includes receiving a first audio signal captured at a microphone and a second audio signal provided to a speaker. The technique continues by synchronizing the second audio signal with the first audio signal to generate a synchronized audio signal and transforming the synchronized audio signal to a first subband representation and the first audio signal to a second subband representation. The technique then includes calculating a transfer function associated with the speaker and the microphone based on the first subband representation and the second subband representation.

Further embodiments provide, among other things, a system and a non-transitory computer-readable medium configured to implement the technique set forth above.

Advantageously, the disclosed techniques and system architectures allow for an audio system that can provide neutral audio reproduction and may operate independently of the audio source material and the amount of background noise.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

In various embodiments, an audio system, such as an audio playback device, may utilize a calibration procedure so that the audio system may provide transparent audio reproduction having a frequency response that does not affect the spectrum of the original audio playback material. Such a calibration procedure may be involved in the reproduction of binaural audio over headphones, room correction for speaker-based stereo and surround setups, and multi-speaker setups for ambisonic reproduction or wavefield synthesis, just to name a few examples. In various embodiments, to provide a substantially neutral reproduction in the case of binaural reproduction over headphones, for instance, a microphone may be placed at the entrance to an ear canal of a person to estimate a headphone-to-microphone transfer function. The transfer function may be estimated continuously or on a periodic basis. An equalization filter may be derived from the inverse of the estimated transfer function. During operation, such an audio system may operate independently of the audio source material and the amount of background noise.

Embodiments herein present techniques for calibrating an audio system to account for various audio source material and noise. In various embodiments, the calibration may involve transforming audio signals to subband representations and calculating a transfer function associated with a speaker and a microphone of the audio system based on the subband representations, as described below.

Figure 1:
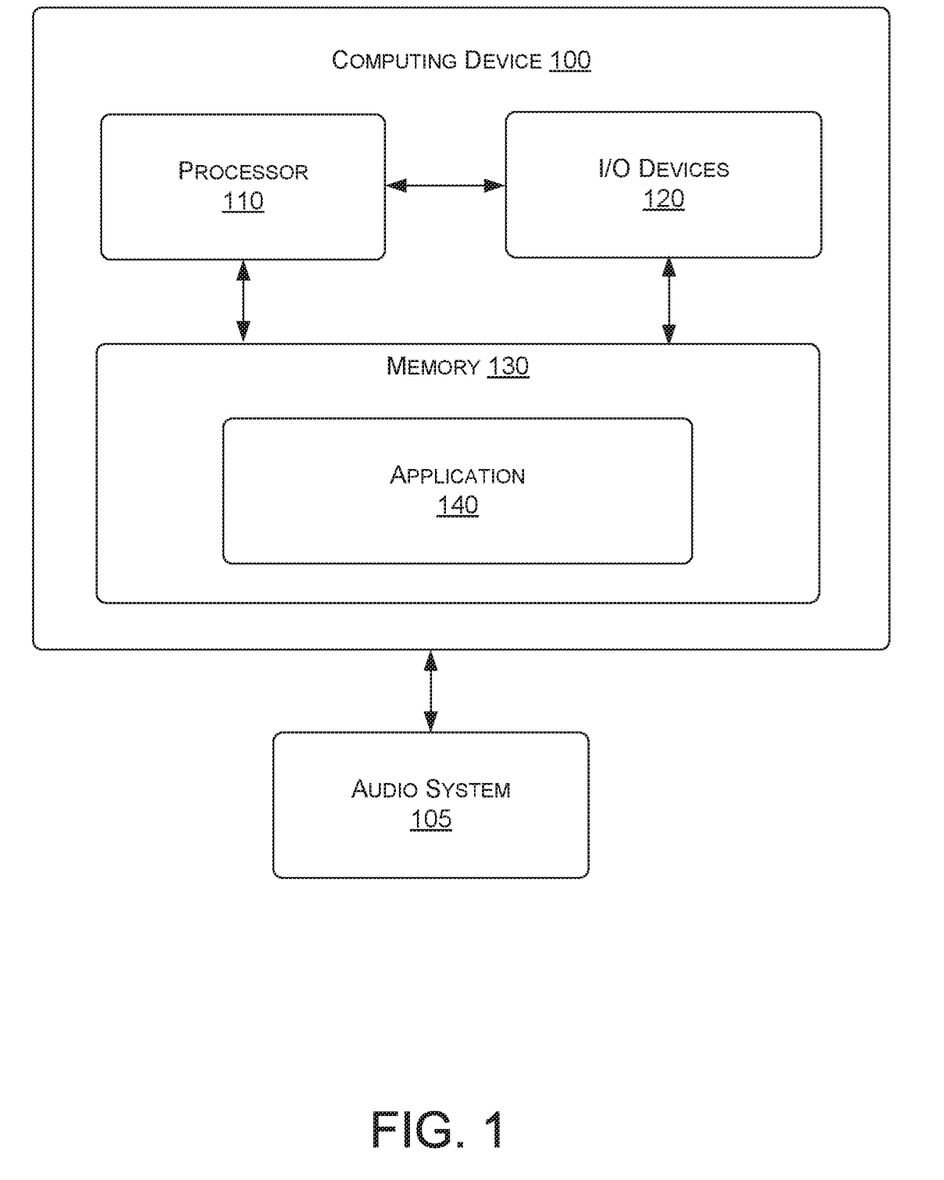
FIG. 1 illustrates a computing device configured to implement one or more aspects of an audio system, according to various embodiments.

FIG. 1 illustrates a computing device 100 configured to implement one or more aspects of an audio system 105, according to various embodiments described below, for example. As illustrated, computing device 100 includes a processor 110, input/output (I/O) devices 120, and a memory 130. Memory 130 includes a calibration application 140 configured to calibrate audio system 105 using a subband-based technique, for example. Computing device 100 may be electrically connected (e.g., wirelessly or wired) to audio system 105.

Processor 110 may be any technically feasible form of processing device configured to process data to generate output, such as by executing program code. Processor 110 could be, for example, and without limitation, a central processing unit (CPU), a graphics processing unit (GPU), an application-specific integrated circuit (ASIC), a field-programmable gate array (FPGA), an analog signal processor (ASP) (e.g., an analog noise cancellation circuit), and so forth.

Memory 130 may include a memory module or a collection of memory modules. Calibration application 140 within memory 130 may be executed by processor 110 to implement the overall functionality of computing device 100. For example, and without limitation, processor 110 may receive an audio signal captured at a microphone of audio system 105 and a playback audio signal provided to a speaker of audio system 105. Processor 110 may synchronize the playback audio signal with the captured audio signal to generate a synchronized audio signal and transform the synchronized audio signal to a first subband representation and the captured audio signal to a second subband representation. Processor 110 may then calculate a transfer function associated with the speaker and the microphone based on the first subband representation and the second subband representation. Details regarding these operations are provided below in conjunction with FIGS. 2-6.

I/O devices 120 may include input devices, output devices, and devices capable of both receiving input and providing output. For example, and without limitation, I/O devices 120 could include wired and/or wireless communication devices that send information from processor 110 to audio system 105 and/or multiple speakers of I/O devices 120.

Audio system 105 may include any of a number of types of audio playback devices involved in any of a number of types of situations, such as the reproduction of binaural audio over headphones, room correction for speaker-based stereo and surround setups, multi-speaker setups for ambisonic reproduction or wavefield synthesis, and so on. In various embodiments, audio system 105 may provide original playback material and captured audio to computing device 100 via I/O devices 120. The captured audio may be captured by a microphone included in audio system 105, as described below. Also, computing device 100 may provide modified playback material to audio system 105. Such modification may involve equalization (EQ) applied to the original playback material and based, at least in part, on the captured audio.

Figure 2:
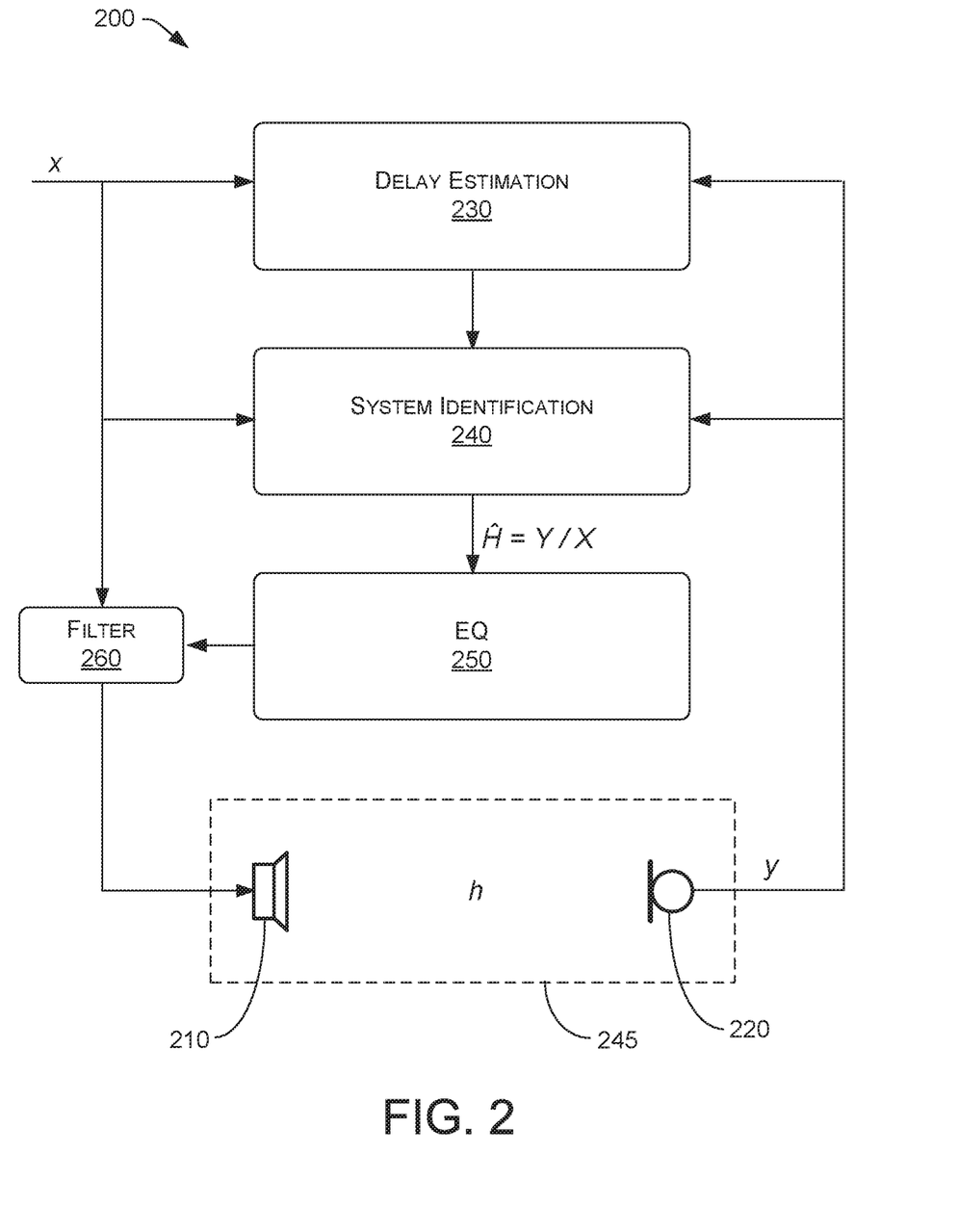
FIG. 2 is a block diagram of an audio calibration system implemented by the computing device of FIG. 1, according to various embodiments.

FIG. 2 is a block diagram of an audio calibration system 200 implemented by the computing device 100 of FIG. 1, according to various embodiments. As illustrated, audio calibration system 200 includes a speaker 210, a microphone 220, a delay estimation module 230, a system identification module 240, an EQ module 250, and a filter 260. Delay estimation module 230, system identification module 240, EQ module 250, and filter 260 may be included in computing device 100 of FIG. 1. Audio calibration system 200 may be used for audio system 105, which may include one or more speakers 210 and one or more microphones 220. Hereinafter, embodiments are described as involving a single speaker 210 and a single microphone 220, though claimed subject matter is not limited in this respect.

A delay estimation block 230 may receive and synchronize a playback audio signal x with a captured signal y captured by microphone 220 so that the two signals x and y substantially overlap with one another. For example, such synchronizing may involve delaying playback audio signal x so that it is substantially in phase with captured signal y. Audio signal x is an electronic or other type of signal (e . . . , such as a digital signal, optical signal, and so on) provided by audio system 105 for audio rendering by speaker 210, for example. Captured signal y is an electronic signal generated by microphone 220 in response to microphone 220 receiving a physical audio signal, via an air path, from speaker 210. A system identification block 240 processes both playback audio signal x and captured signal y to generate a subband representation of the playback audio signal x and the captured signal y. Such a representation, which involves sub-band coding (SBC), is a form of transform coding that breaks an audio signal into a number of different frequency bands, such as by using a fast Fourier transform. Each band may subsequently be processed and/or analyzed independently of the other bands.

A transfer function for an environment 245, represented as h in FIG. 2, between speaker 210 and microphone 220 may be estimated from the subband representation of captured signal y and the subband representation of the synchronized playback audio signal x. The transfer function may be subsequently used by an EQ block 250 to derive an equalization filter 260 applied to playback audio signal x, which may be filtered by equalization filter 260 before playback by speaker 210. For example, equalization filter 260 may individually adjust each of a number of frequency components (or frequency ranges) of playback audio signal x. Such filtering allows for calibrating playback audio signal x to account for noise and various aspects of sound reproduction by audio system 105, for example.

Figure 3:
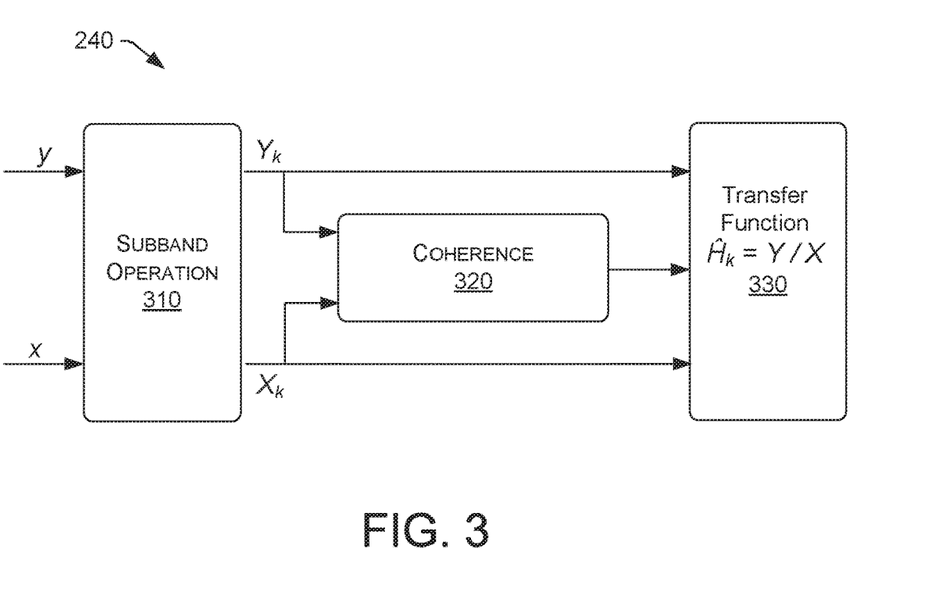
FIG. 3 is a block diagram of the system identification block included in the audio calibration system of FIG. 2, according to various embodiments.

FIG. 3 is a block diagram of system identification block 240 included in audio calibration system 200 of FIG. 2, according to various embodiments. System identification block 240 includes a subband operation block 310, a coherence block 320, and a transfer function block 330.

Subband operation block 310 receives both playback audio signal x and captured signal y and transforms these signals into a subband representation, expressed as k-band values for the synchronized playback signal $X_k$ and the captured signal $Y_k$. The subband representation allows for performing calibration operations in the frequency domain, so that different frequency bands of the playback signal can be treated differently from one another. For example, depending on the type of audio source material, equalization filtering may be applied differently to different frequency bands of the playback signal. Transfer function block 330 estimates a transfer function $\hat{H}_k$ for individual spectral bands k. Transfer function block 330 may estimate the transfer function h between speaker 210 and microphone 220, for example, by either a complex or magnitude frequency ratio $\hat{H}=Y_k/X_k$ between the captured subband representation $Y_k$ and the synchronized playback subband representation $X_k$. Coherence block 320 may estimate the coherence between $Y_k$ and $X_k$. The coherence, which may be the magnitude-squared coherence, may be used to control how the estimate of the transfer function is computed. Coherence, having values between 0 and 1, is a measure of similarity between y and x. For example, a coherence of 1 indicates that y and x are perfectly related through a linear time invariant (LTI) system. A coherence of 0 indicates that y and x are different, uncorrelated, and independent of one another. Equalization filtering generally relies on y having a substantially linear relation to x, which is the case for when the coherence between y and x, or between $Y_k$ and $X_k$ for individual spectral bands k, is close to 1

The transfer function, given by $\hat{H}=Y_k/X_k$, may be used by EQ block 250 to derive an equalization filter that may be, for example, the reciprocal of $\hat{H}$, which is used to filter x before playback, as mentioned above. The transfer function $\hat{H}$ is calculated for each individual spectral band k. Thus, $\hat{H}$ is a transfer function between Y and X in the frequency domain.

To control the speed/smoothness of the transition, or update, between consecutive transfer function estimates of varying k, the following exponential averaging relation may be used:

$$\hat{H}^t_k = \alpha_k \hat{H}^{t-1}_k + (1-\alpha_k) H'_k,$$

Equation 1 where $\hat{H}^t_k$ is the current transfer function estimate for the kth-band and $\hat{H}^{t-1}_k$ is the previous estimate for the kth-band. $H'_k$ is the instantaneous estimate and $\alpha_k$ is a smoothing factor for spectral band k, which is in a range from 0 to 1 for the kth-band.

To control the effect of the bandwidth of x and the acoustic background noise n, $\alpha_k$ depends, at least in part, on the subband coherence (which may be magnitude-squared coherence). In one embodiment, if the signal-to-noise ratio (SNR) is relatively low, then the speed of the update is slowed down or stopped. A relatively low SNR may occur for low energy in x or relatively high noise energy in a particular band k, for example. Conversely, if the SNR is relatively high, then the speed of the update is accelerated. Thus, the updating is based, at least in part, on the smoothing factor $\alpha_k$ that depends, in turn, on the coherence. If the coherence is relatively large, then there is a strong relation between y and x and $\alpha_k$ has a value leading to relatively fast (e.g., frequent) updates. On the other hand, if the coherence is relatively small, then there is a weak relation between y and x and $\alpha_k$ has a value leading to relatively slow (e.g., infrequent) updates. Moreover, if the coherence is particularly small, then the frequency of updates approaches zero and updates may not occur. This relation between coherence and frequency of updates allows for the audio system to update transfer function estimates of varying k at a rate that is high enough so that the audio system is well-calibrated but low enough to avoid audio artifacts resulting from large jumps between consecutive transfer functions.

Figure 4:
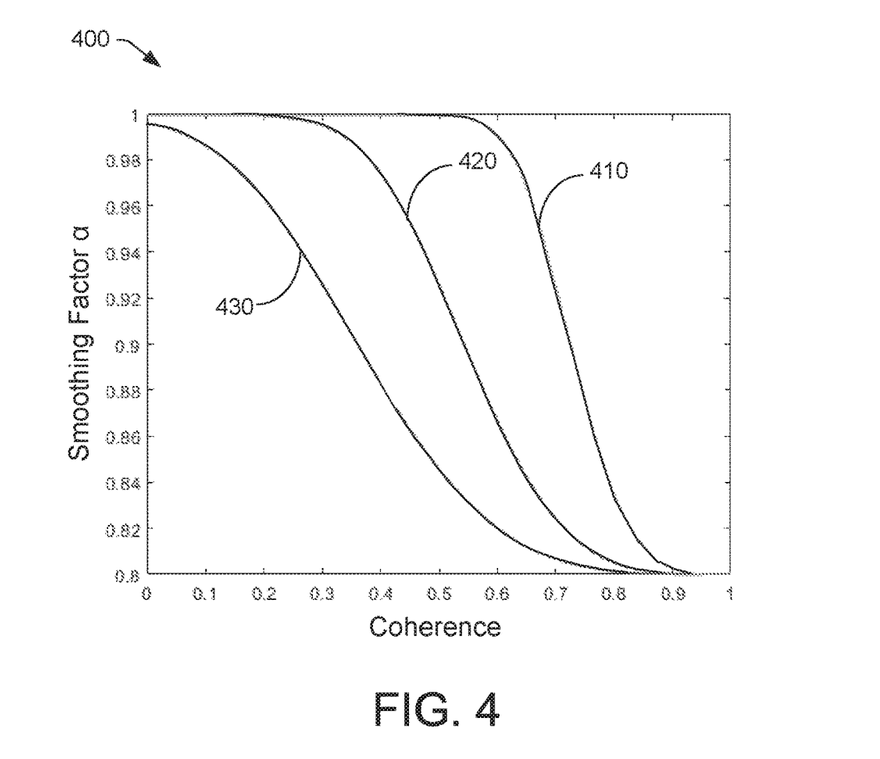
FIG. 4 is a graph of smoothing factor versus coherence for several different weights of signal to noise ratio, according to various embodiments.

FIG. 4 is a graph 400 of smoothing factor $\alpha_k$ versus coherence for several different weights of SNR, according to various embodiments. Curve 410 is more sensitive to a reduction in coherence than either of curves 420 and 430. In particular, curve 410 will slow down the update rate more quickly than curves 420 and 430. For example, curve 410 illustrates a smoothing factor close to 1 (e.g., a situation involving almost no update) for a coherence of 0.5, and a smoothing factor close to 0.8 for a coherence of 0.9. In various embodiments, a functional relation between the smoothing factor $\alpha_k$ and the coherence is based, at least in part, on psycho-acoustic parameters, which considers, for example, human (or animal) sound perception and audiology and the psychological and physiological responses associated with sound. For instance, for an audio signal to be just audible (e.g., threshold for being audible), the audio signal should be about 10 dB louder than a broadband noise masker (e.g., an SNR of at least about 10 dB). A 0-dB SNR corresponds to a coherence value of 0.5. A 10-dB increase pushes the coherence to about 0.9. Thus, for instance, curve 410 represents an example of a psycho-acoustically motivated curve.

Figure 5:
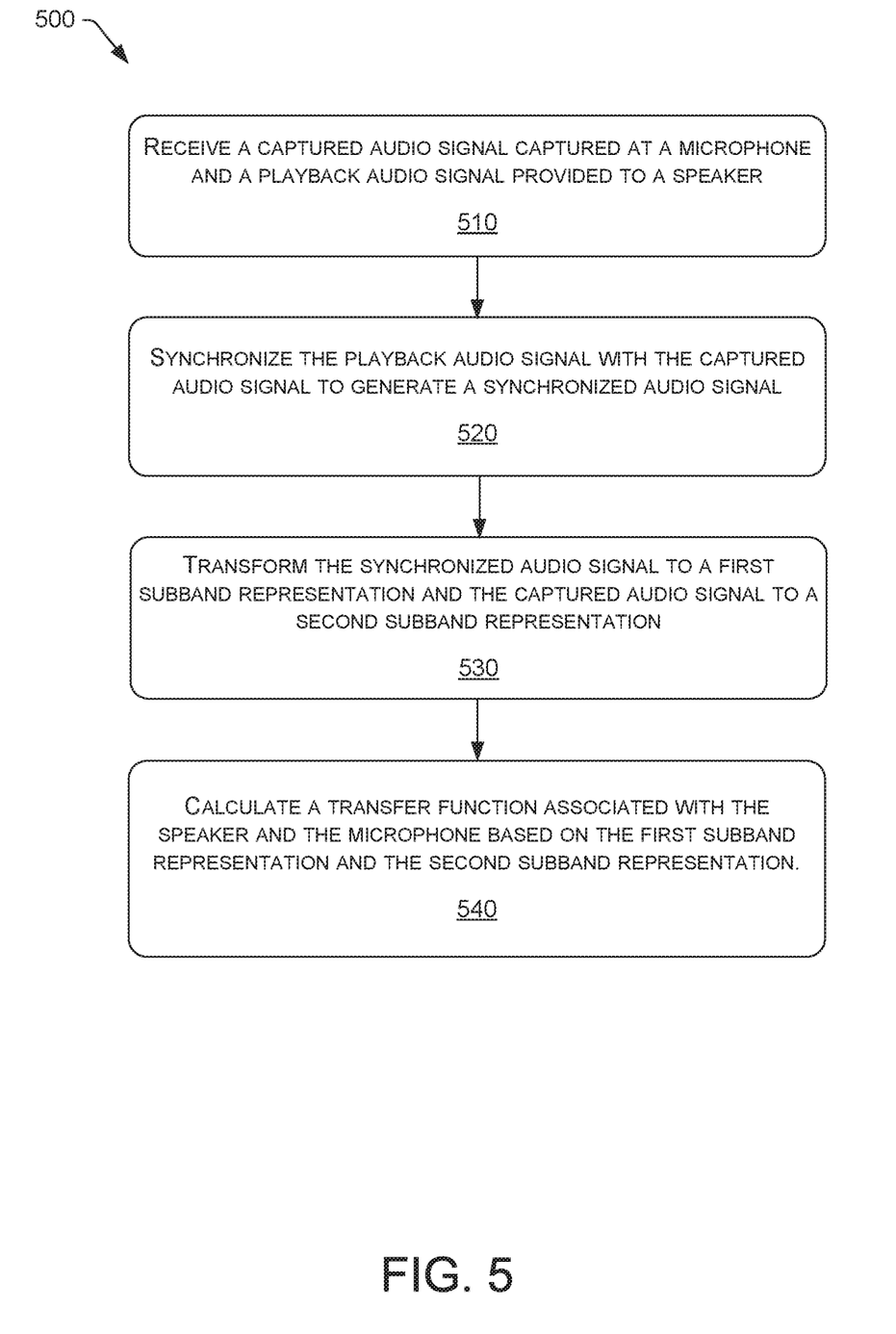
FIG. 5 is a flow diagram of method steps for calculating a transfer function for an audio system, according to various embodiments.

FIG. 5 is a flow diagram of method steps for calculating a transfer function for audio system 105, according to various embodiments. Although the method steps are described with reference to computing device 100 and audio system 105 of FIG. 1, persons skilled in the art will understand that any system configured to implement the method steps, in any order, falls within the scope of the present disclosure.

As shown, a method 500 begins at step 510, where processor 110 receives a captured audio signal y (illustrated in FIG. 2) captured at microphone 220 and a playback audio signal x provided to speaker 210, for example. At step 520, processor 110 synchronizes the playback audio signal with the captured audio signal to generate a synchronized audio signal. In various embodiments, synchronizing the playback audio signal involves determining a delay between the captured audio signal and the playback audio signal, and processing the playback audio signal based on the delay to generate the synchronized audio signal.

At step 530, processor 110 transforms the synchronized audio signal to a first subband representation and the captured audio signal to a second subband representation. The first subband representation comprises a first set of spectral bands and the second subband representation comprises a second set of spectral bands that correspond respectively to the first set of spectral bands. At step 540, processor 110 calculates a transfer function associated with the speaker and the microphone based on the first subband representation and the second subband representation. In various embodiments, the playback audio signal provided to speaker 210 is filtered based at least in part on the transfer function. In particular embodiments, processor 110 derives an equalization filter based at least in part on the transfer function and applies the equalization filter to the playback audio signal.

In various embodiments, processor 110 calculates multiple transfer functions, each transfer function corresponding to an individual spectral band. For example, processor 110 may calculate the transfer function by calculating a partial transfer function for each pair of corresponding spectral bands of the first and second set of spectral bands. Subsequently, in various embodiments, method 500 may further include calculating a coherence for each pair of corresponding spectral bands of the first and the second set of spectral bands.

In various embodiments, method 500 may further include updating, based at least in part on the coherence, the partial transfer function associated with the first spectral band of the first subband representation and the second subband representation. In various embodiments, updating the partial transfer functions is performed at a rate that is based, at least in part, on a comparison between one or more bands of the first subband representation and measured acoustic background noise.

Figure 6:
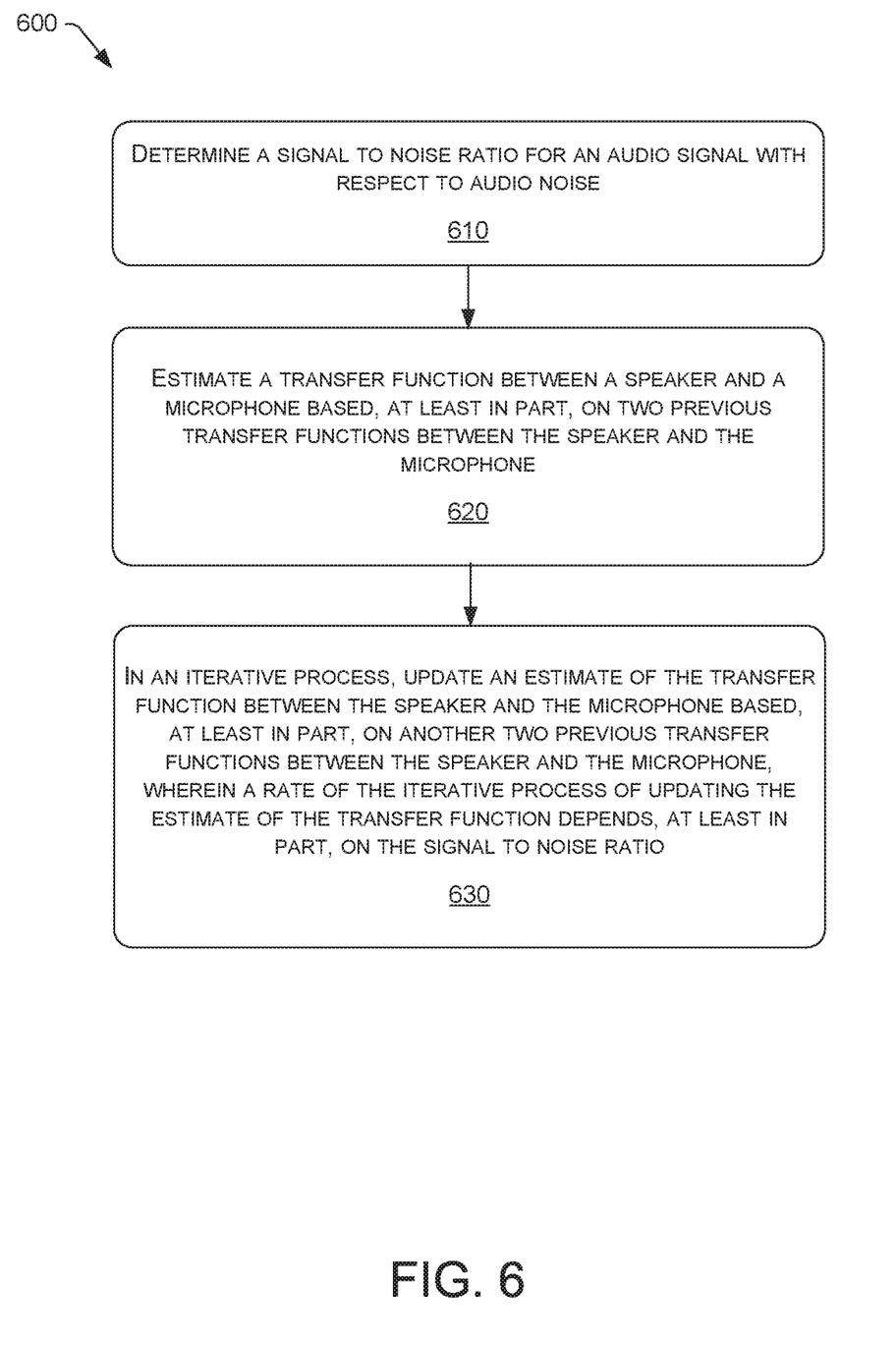
FIG. 6 is a flow diagram of method steps for calculating a transfer function for an audio system, according to various embodiments.

FIG. 6 is a flow diagram of method steps for calculating a transfer function for audio system 105, according to various embodiments. Although the method steps are described with reference to computing device 100 and audio system 105 of FIG. 1, persons skilled in the art will understand that any system configured to implement the method steps, in any order, falls within the scope of the present disclosure.

As shown, a method 600 begins at step 610, where processor 110 determines an SNR for an audio signal with respect to audio noise. The processor may determine the SNR by determining an SNR for individual subbands k of the audio signal with respect to the audio noise, for example.

At step 620, processor 110 estimates a transfer function between speaker 210 and microphone 220 based, at least in part, on two previous transfer functions between the speaker and the microphone. The processor may estimate the transfer function by estimating a transfer function for the individual subbands k between the speaker and the microphone. In some implementations, processor 110 may derive an equalization filter based at least in part on an inverse of the transfer function. For example, the audio signal x may be modified by applying the equalization filter to the audio signal before the audio signal reaches speaker 210.

At step 630, processor 110, in an iterative process, updates an estimate of the transfer function between the speaker and the microphone based, at least in part, on another two previous transfer functions between the speaker and the microphone. A rate of the iterative process of updating the estimate of the transfer function depends, at least in part, on the SNR. For example, the rate of the iterative process is increased if the signal to noise ratio is increased and the rate of the iterative process is decreased if the signal to noise ratio is decreased.

In various embodiments, processor 110 may transform the audio signal produced by speaker 210 to a first subband representation and transform the captured audio signal captured by microphone 220 to a second subband representation. Subsequently, processor 110 may calculate a coherence between each spectral band of the first and the second subband representations. In some implementations, the rate of the iterative process of updating the estimate of the transfer function depends, at least in part, on the coherence. In some implementations, processor 110 updates the estimate of the transfer function between the speaker and the microphone based, at least in part, on smoothing factor $\alpha_k$, which may be based, at least in part, on the coherence.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 7:
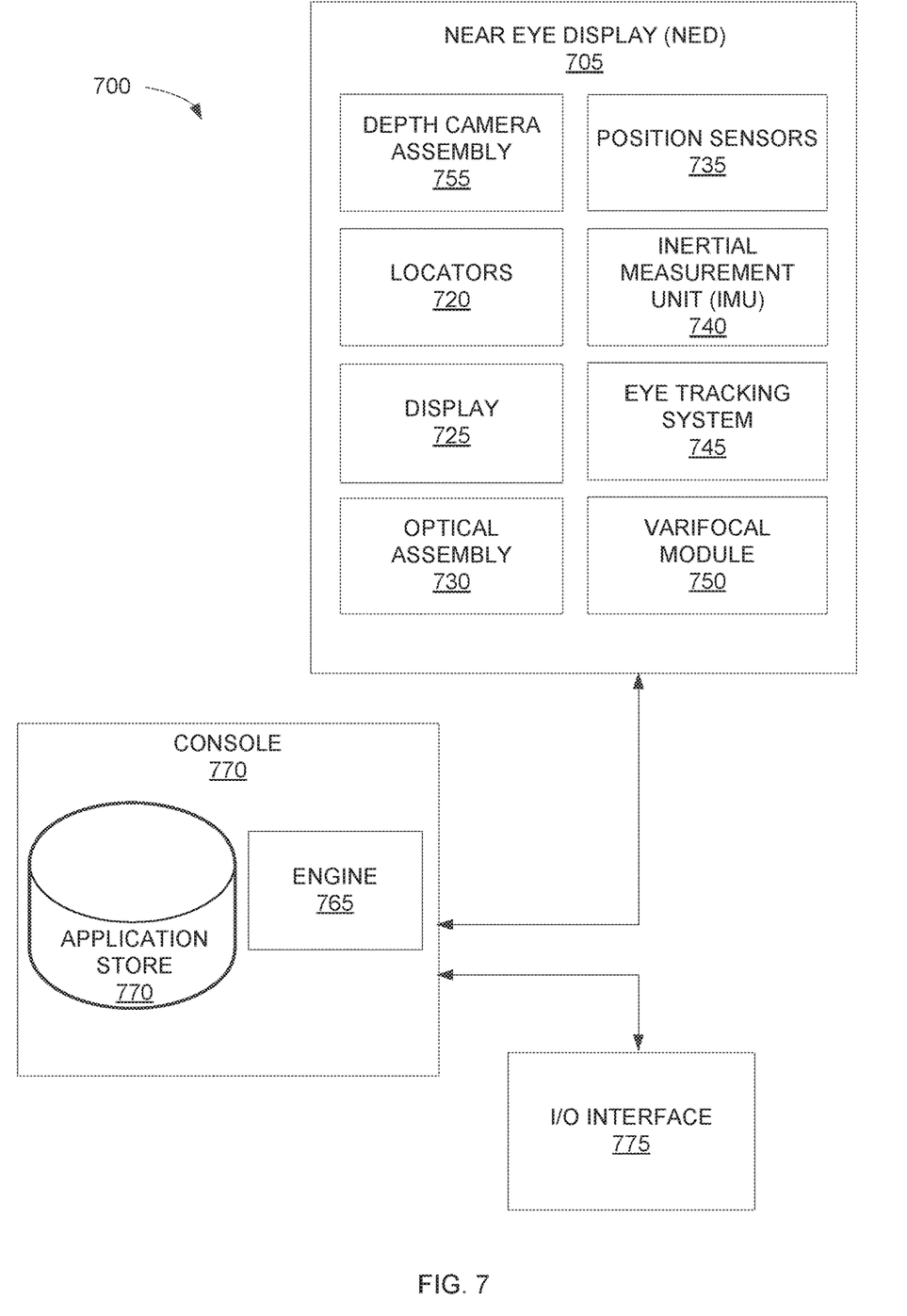
FIG. 7 is a block diagram of an embodiment of a near eye display (NED) system in which a console operates, according to various embodiments.

FIG. 7 is a block diagram of an embodiment of a near eye display (NED) system 700 in which a console 770 operates. The NED system 700 may operate in a virtual reality (VR) system environment, an augmented reality (AR) system environment, a mixed reality (MR) system environment, or some combination thereof. The NED system 700 shown in FIG. 7 comprises a NED 705 and an input/output (I/O) interface 775 that is coupled to the console 770. In various embodiments, the audio system 105 is included in or operates in conjunction with the NED system 700. For example, the audio system 105 may be included within NED 705 or may be coupled to the console 770 and/or the NED 705. Further, the application 140 may execute on the console 770 or within the NED 705.

While FIG. 7 shows an example NED system 700 including one NED 705 and one I/O interface 775, in other embodiments any number of these components may be included in the NED system 700. For example, there may be multiple NEDs 705, and each NED 705 has an associated I/O interface 775. Each NED 705 and I/O interface 775 communicates with the console 770. In alternative configurations, different and/or additional components may be included in the NED system 700. Additionally, various components included within the NED 705, the console 770, and the I/O interface 775 may be distributed in a different manner than is described in conjunction with FIGS. 1-6 in some embodiments. For example, some or all of the functionality of the console 770 may be provided by the NED 705 and vice versa.

The NED 705 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 705 may also present audio content to a user. The NED 705 and/or the console 770 may transmit the audio content to an external device via the I/O interface 775. The external device may include various forms of speaker systems and/or headphones. In various embodiments, the audio content is synchronized with visual content being displayed by the NED 705.

The NED 705 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 7, the NED 705 may include a depth camera assembly (DCA) 755, one or more locators 720, a display 725, an optical assembly 730, one or more position sensors 735, an inertial measurement unit (IMU) 740, an eye tracking system 745, and a varifocal module 750. In some embodiments, the display 725 and the optical assembly 730 can be integrated together into a projection assembly. Various embodiments of the NED 705 may have additional, fewer, or different components than those listed above. Additionally, the functionality of each component may be partially or completely encompassed by the functionality of one or more other components in various embodiments.

The DCA 755 captures sensor data describing depth information of an area surrounding the NED 705. The sensor data may be generated by one or a combination of depth imaging techniques, such as triangulation, structured light imaging, time-of-flight imaging, stereo imaging, laser scan, and so forth. The DCA 755 can compute various depth properties of the area surrounding the NED 705 using the sensor data. Additionally or alternatively, the DCA 755 may transmit the sensor data to the console 770 for processing. Further, in various embodiments, the DCA 755 captures or samples sensor data at different times. For example, the DCA 755 could sample sensor data at different times within a time window to obtain sensor data along a time dimension.

The DCA 755 includes an illumination source, an imaging device, and a controller. The illumination source emits light onto an area surrounding the NED 705. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VC-SEL), or some other source. In some embodiments, a single emitter or a plurality of emitters in the illumination source can emit light having a structured light pattern. The imaging device captures ambient light in the environment surrounding NED 705, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 720 are objects located in specific positions on the NED 705 relative to one another and relative to a specific reference point on the NED 705. A locator 780 may be a light emitting diode (LED), a corner cube reflector, a reflective marker, a type of light source that contrasts with an environment in which the NED 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 7700 nm), in the ultraviolet band (70 nm to 380 nm), some other portion of the electromagnetic spectrum, or some combination thereof.

In some embodiments, the locators 720 are located beneath an outer surface of the NED 705, which is transparent to the wavelengths of light emitted or reflected by the locators 720 or is thin enough not to substantially attenuate the wavelengths of light emitted or reflected by the locators 720. Additionally, in some embodiments, the outer surface or other portions of the NED 705 are opaque in the visible band of wavelengths of light. Thus, the locators 720 may emit light in the IR band under an outer surface that is transparent in the IR band but opaque in the visible band.

The display 725 displays two-dimensional or three-dimensional images to the user in accordance with pixel data received from the console 770 and/or one or more other sources. In various embodiments, the display 725 comprises a single display or multiple displays (e.g., separate displays for each eye of a user). In some embodiments, the display 725 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 725 and used separately, in parallel, and/or in combination.

The optical assembly 730 magnifies image light received from the display 725, corrects optical errors associated with the image light, and presents the corrected image light to a user of the NED 705. The optical assembly 730 includes a plurality of optical elements. For example, one or more of the following optical elements may be included in the optical assembly 730: an aperture, a Fresnel lens, a convex lens, a concave lens, a filter, a reflecting surface, or any other suitable optical element that deflects, reflects, refracts, and/or in some way alters image light. Moreover, the optical assembly 730 may include combinations of different optical elements. In some embodiments, one or more of the optical elements in the optical assembly 730 may have one or more coatings, such as partially reflective or antireflective coatings.

In some embodiments, the optical assembly 730 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 725 is pre-distorted, and the optical assembly 730 corrects the distortion as image light from the display 725 passes through various optical elements of the optical assembly 730. In some embodiments, optical elements of the optical assembly 730 are integrated into the display 725 as a projection assembly that includes at least one waveguide coupled with one or more optical elements.

The IMU 740 is an electronic device that generates data indicating a position of the NED 705 based on measurement signals received from one or more of the position sensors 735 and from depth information received from the DCA 755. In some embodiments of the NED 705, the IMU 740 may be a dedicated hardware component. In other embodiments, the IMU 740 may be a software component implemented in one or more processors.

In operation, a position sensor 735 generates one or more measurement signals in response to a motion of the NED 705. Examples of position sensors 735 include: one or more accelerometers, one or more gyroscopes, one or more magnetometers, one or more altimeters, one or more inclinometers, and/or various types of sensors for motion detection, drift detection, and/or error detection. The position sensors 735 may be located external to the IMU 740, internal to the IMU 740, or some combination thereof.

Based on the one or more measurement signals from one or more position sensors 735, the IMU 740 generates data indicating an estimated current position of the NED 705 relative to an initial position of the NED 705. For example, the position sensors 735 include multiple accelerometers to measure translational motion (forward/back, up/down, left/right) and multiple gyroscopes to measure rotational motion (e.g., pitch, yaw, and roll). In some embodiments, the IMU 740 rapidly samples the measurement signals and calculates the estimated current position of the NED 705 from the sampled data. For example, the IMU 740 integrates the measurement signals received from the accelerometers over time to estimate a velocity vector and integrates the velocity vector over time to determine an estimated current position of a reference point on the NED 705. Alternatively, the IMU 740 provides the sampled measurement signals to the console 770, which analyzes the sample data to determine one or more measurement errors. The console 770 may further transmit one or more of control signals and/or measurement errors to the IMU 740 to configure the IMU 740 to correct and/or reduce one or more measurement errors (e.g., drift errors). The reference point is a point that may be used to describe the position of the NED 705. The reference point may generally be defined as a point in space or a position related to a position and/or orientation of the NED 705.

In various embodiments, the IMU 740 receives one or more parameters from the console 770. The one or more parameters are used to maintain tracking of the NED 705. Based on a received parameter, the IMU 740 may adjust one or more IMU parameters (e.g., a sample rate). In some embodiments, certain parameters cause the IMU 740 to update an initial position of the reference point so that it corresponds to a next position of the reference point. Updating the initial position of the reference point as the next calibrated position of the reference point helps reduce drift errors in detecting a current position estimate of the IMU 740.

In various embodiments, the eye tracking system 745 is integrated into the NED 705. The eye-tracking system 745 may comprise one or more illumination sources (e.g., infrared illumination source, visible light illumination source) and one or more imaging devices (e.g., one or more cameras). In operation, the eye tracking system 745 generates and analyzes tracking data related to a user's eyes as the user wears the NED 705. In various embodiments, the eye tracking system 745 estimates the angular orientation of the user's eye. The orientation of the eye corresponds to the direction of the user's gaze within the NED 705. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 745 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 705 on a user's head. The eye tracking system 745 may also detect the torsion of the eye, i.e., rotation of the eye about the pupillary axis. The eye tracking system 745 may use the detected torsion of the eye to estimate the orientation of the foveal axis from the pupillary axis. The eye tracking system 745 may also track a change in the shape of the eye, which may be approximated as a skew or scaling linear transform or a twisting distortion (e.g., due to torsional deformation). The eye tracking system 745 may estimate the foveal axis based on some combination of the angular orientation of the pupillary axis, the translation of the eye, the torsion of the eye, and the current shape of the eye.

As the orientation may be determined for both eyes of the user, the eye tracking system 745 is able to determine where the user is looking. The NED 705 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and though the point halfway between the pupils of the user's eyes.

In some embodiments, the varifocal module 750 is integrated into the NED 705. The varifocal module 750 may be communicatively coupled to the eye tracking system 745 in order to enable the varifocal module 750 to receive eye tracking information from the eye tracking system 745. The varifocal module 750 may further modify the focus of image light emitted from the display 725 based on the eye tracking information received from the eye tracking system 745. Accordingly, the varifocal module 750 can reduce vergence-accommodation conflict that may be produced as the user's eyes resolve the image light. In various embodiments, the varifocal module 750 can be interfaced (e.g., either mechanically or electrically) with at least one optical element of the optical assembly 730.

In operation, the varifocal module 750 may adjust the position and/or orientation of one or more optical elements in the optical assembly 730 in order to adjust the focus of image light propagating through the optical assembly 730. In various embodiments, the varifocal module 750 may use eye tracking information obtained from the eye tracking system 745 to determine how to adjust one or more optical elements in the optical assembly 730. In some embodiments, the varifocal module 750 may perform foveated rendering of the image light based on the eye tracking information obtained from the eye tracking system 745 in order to adjust the resolution of the image light emitted by the display 725. In this case, the varifocal module 750 configures the display 725 to display a high pixel density in a foveal region of the user's eye-gaze and a low pixel density in other regions of the user's eye-gaze.

The I/O interface 775 facilitates the transfer of action requests from a user to the console 770. In addition, the I/O interface 775 facilitates the transfer of device feedback from the console 770 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 775 may include one or more input devices. Example input devices include: a keyboard, a mouse, a game controller, a joystick, and/or any other suitable device for receiving action requests and communicating the action requests to the console 770. In some embodiments, the I/O interface 775 includes an IMU 740 that captures calibration data indicating an estimated current position of the I/O interface 775 relative to an initial position of the I/O interface 775.

In operation, the I/O interface 775 receives action requests from the user and transmits those action requests to the console 770. Responsive to receiving the action request, the console 770 performs a corresponding action. For example, responsive to receiving an action request, console 770 may configure I/O interface 775 to emit haptic feedback onto an arm of the user. For example, console 775 may configure I/O interface 775 to deliver haptic feedback to a user when an action request is received. Additionally or alternatively, the console 770 may configure the I/O interface 775 to generate haptic feedback when the console 770 performs an action, responsive to receiving an action request.

The console 770 provides content to the NED 705 for processing in accordance with information received from one or more of: the DCA 755, the eye tracking system 745, one or more other components of the NED 705, and the I/O interface 775. In the embodiment shown in FIG. 7, the console 770 includes an application store 770 and an engine 765. In some embodiments, the console 770 may have additional, fewer, or different modules and/or components than those described in conjunction with FIG. 7. Similarly, the functions further described below may be distributed among components of the console 770 in a different manner than described in conjunction with FIG. 7.

The application store 770 stores one or more applications for execution by the console 770. An application is a group of instructions that, when executed by a processor, performs a particular set of functions, such as generating content for presentation to the user. For example, an application may generate content in response to receiving inputs from a user (e.g., via movement of the NED 705 as the user moves his/her head, via the I/O interface 775, etc.). Examples of applications include: gaming applications, conferencing applications, video playback applications, or other suitable applications.

In some embodiments, the engine 765 generates a three-dimensional mapping of the area surrounding the NED 705 (i.e., the "local area") based on information received from the NED 705. In some embodiments, the engine 765 determines depth information for the three-dimensional mapping of the local area based on depth data received from the NED 705. In various embodiments, the engine 765 uses depth data received from the NED 705 to update a model of the local area and to generate and/or modify media content based in part on the updated model of the local area.

The engine 765 also executes applications within the NED system 700 and receives position information, acceleration information, velocity information, predicted future positions, or some combination thereof, of the NED 705. Based on the received information, the engine 765 determines various forms of media content to transmit to the NED 705 for presentation to the user. For example, if the received information indicates that the user has looked to the left, the engine 765 generates media content for the NED 705 that mirrors the user's movement in a virtual environment or in an environment augmenting the local area with additional media content. Accordingly, the engine 765 may generate and/or modify media content (e.g., visual and/or audio content) for presentation to the user. The engine 765 may further transmit the media content to the NED 705. Additionally, in response to receiving an action request from the I/O interface 775, the engine 765 may perform an action within an application executing on the console 770. The engine 765 may further provide feedback when the action is performed. For example, the engine 765 may configure the NED 705 to generate visual and/or audio feedback and/or the I/O interface 775 to generate haptic feedback to the user.

In some embodiments, based on the eye tracking information (e.g., orientation of the user's eye) received from the eye tracking system 745, the engine 765 determines a resolution of the media content provided to the NED 705 for presentation to the user on the display 725. The engine 765 may adjust a resolution of the visual content provided to the NED 705 by configuring the display 725 to perform foveated rendering of the visual content, based at least in part on a direction of the user's gaze received from the eye tracking system 745. The engine 765 provides the content to the NED 705 having a high resolution on the display 725 in a foveal region of the user's gaze and a low resolution in other regions, thereby reducing the power consumption of the NED 705. In addition, using foveated rendering reduces a number of computing cycles used in rendering visual content without compromising the quality of the user's visual experience. In some embodiments, the engine 765 can further use the eye tracking information to adjust a focus of the image light emitted from the display 725 in order to reduce vergence-accommodation conflicts.

Figure 8A:
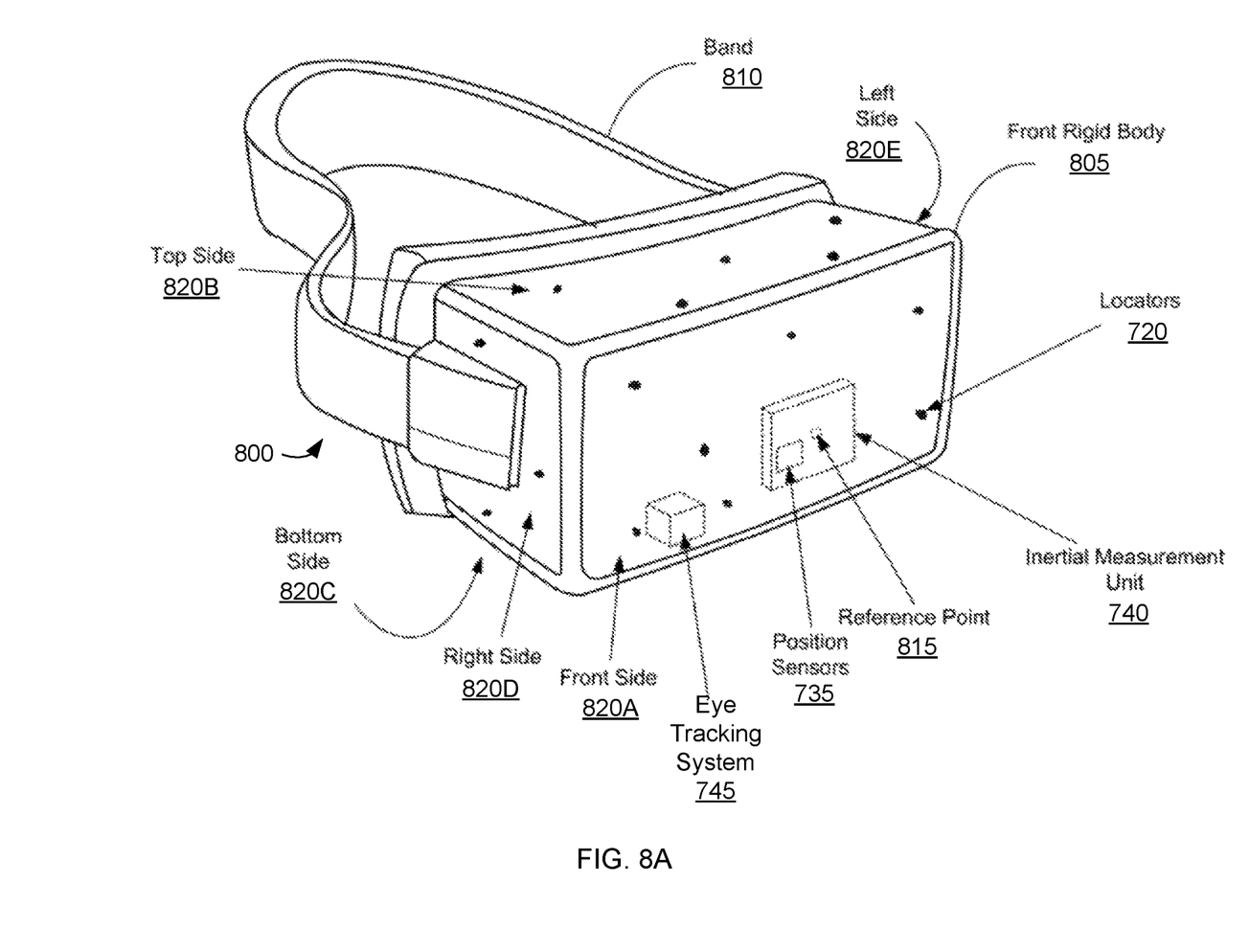
FIG. 8A is a diagram of an NED, according to various embodiments.

FIG. 8A is a diagram of an NED 800, according to various embodiments. In various embodiments, NED 800 presents media to a user. The media may include visual, auditory, and haptic content. In some embodiments, NED 800 provides artificial reality (e.g., virtual reality) content by providing a real-world environment and/or computer-generated content. In some embodiments, the computer-generated content may include visual, auditory, and haptic information. The NED 800 is an embodiment of the NED 705 and includes a front rigid body 805 and a band 810. The front rigid body 805 includes an electronic display element of the electronic display 725 (not shown in FIG. 8A), the optics assembly 730 (not shown in FIG. 8A), the IMU 740, the one or more position sensors 735, the eye tracking system 745, and the locators 720. In the embodiment shown by FIG. 8A, the position sensors 735 are located within the IMU 740, and neither the IMU 740 nor the position sensors 735 are visible to the user.

The locators 720 are located in fixed positions on the front rigid body 805 relative to one another and relative to a reference point 815. In the example of FIG. 8A, the reference point 815 is located at the center of the IMU 740. Each of the locators 720 emits light that is detectable by the imaging device in the DCA 755. The locators 720, or portions of the locators 720, are located on a front side 820A, a top side 820B, a bottom side 820C, a right side 820D, and a left side 820E of the front rigid body 805 in the example of FIG. 8A.

The NED 800 includes the eye tracking system 745. As discussed above, the eye tracking system 745 may include a structured light generator that projects an interferometric structured light pattern onto the user's eye and a camera to detect the illuminated portion of the eye. The structured light generator and the camera may be located off the axis of the user's gaze. In various embodiments, the eye tracking system 745 may include, additionally or alternatively, one or more time-of-flight sensors and/or one or more stereo depth sensors. In FIG. 8A, the eye tracking system 745 is located below the axis of the user's gaze, although the eye tracking system 745 can alternately be placed elsewhere. Also, in some embodiments, there is at least one eye tracking unit for the left eye of the user and at least one tracking unit for the right eye of the user.

In various embodiments, the eye tracking system 745 includes one or more cameras on the inside of the NED 800. The camera(s) of the eye tracking system 745 may be directed inwards, toward one or both eyes of the user while the user is wearing the NED 800, so that the camera(s) may image the eye(s) and eye region(s) of the user wearing the NED 800. The camera(s) may be located off the axis of the user's gaze. In some embodiments, the eye tracking system 745 includes separate cameras for the left eye and the right eye (e.g., one or more cameras directed toward the left eye of the user and, separately, one or more cameras directed toward the right eye of the user).

Figure 8B:
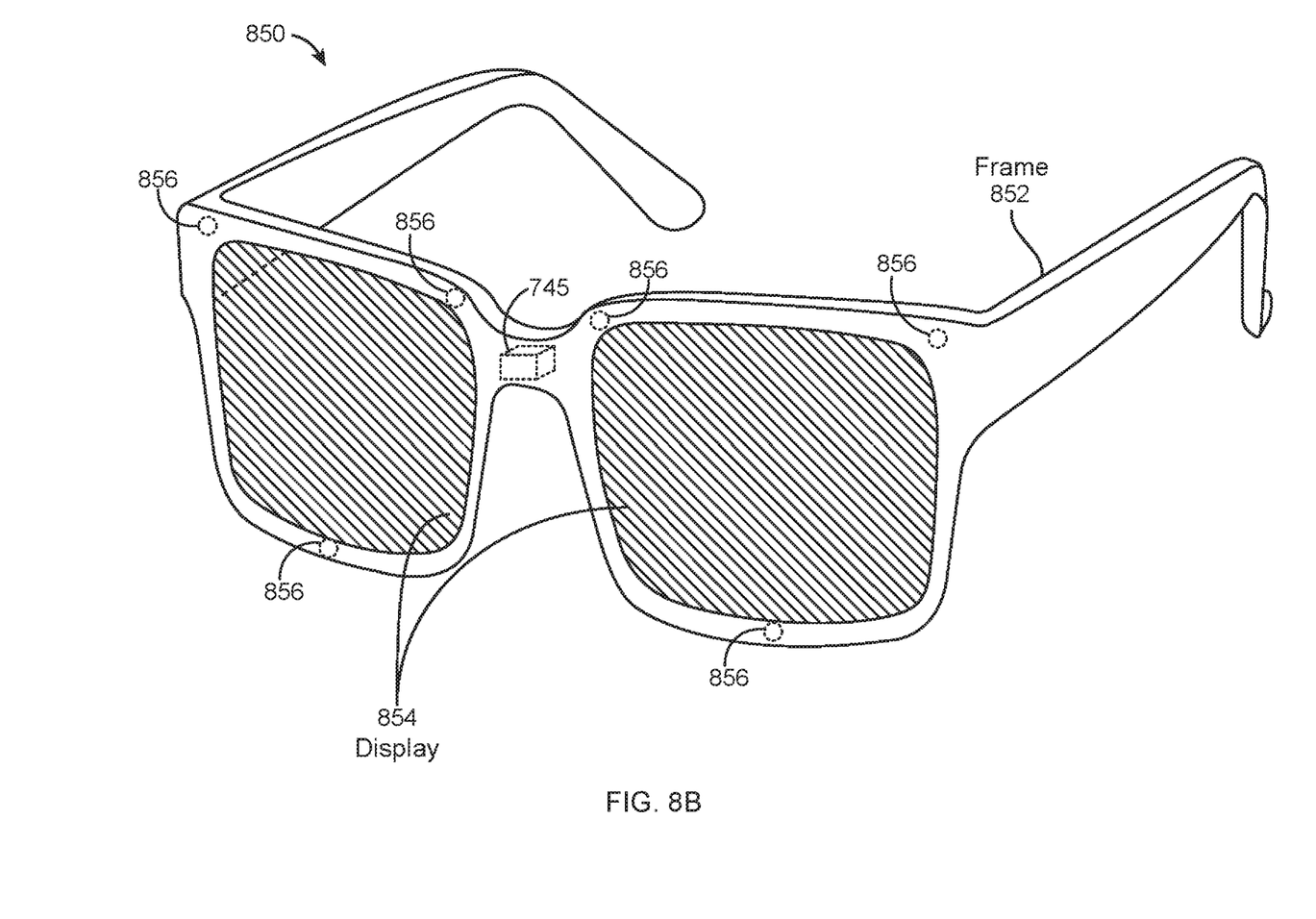
FIG. 8B is another diagram of an NED, according to various embodiments

FIG. 8B is a diagram of an NED 850, according to various embodiments. In various embodiments, NED 850 presents media to a user. The media may include visual, auditory, and haptic content. In some embodiments, NED 850 provides artificial reality (e.g., augmented reality) content by providing a real-world environment and/or computer-generated content. In some embodiments, the computer-generated content may include visual, auditory, and haptic information. The NED 800 is an embodiment of the NED 705.

NED 850 includes frame 852 and display 854. In various embodiments, the NED 850 may include one or more additional elements. Display 854 may be positioned at different locations on the NED 250 than the locations illustrated in FIG. 8B. Display 854 is configured to provide content to the user, including audiovisual content. In some embodiments, one or more displays 854 may be located within frame 852.

NED 850 further includes eye tracking system 745 and one or more corresponding modules 856. The modules 856 may include emitters (e.g., light emitters) and/or sensors (e.g., image sensors, cameras). In various embodiments, the modules 856 are arranged at various positions along the inner surface of the frame 852, so that the modules 856 are facing the eyes of a user wearing the NED 850. For example, the modules 856 could include emitters that emit structured light patterns onto the eyes and image sensors to capture images of the structured light pattern on the eyes. As another example, the modules 856 could include multiple time-of-flight sensors for directing light at the eyes and measuring the time of travel of the light at each pixel of the sensors. As a further example, the modules 856 could include multiple stereo depth sensors for capturing images of the eyes from different vantage points. In various embodiments, the modules 856 also include image sensors for capturing 2D images of the eyes.

In sum, various embodiments set forth techniques and system architectures that allow for subband-based audio calibration. Some techniques may be performed by a computing system and include receiving a captured audio signal captured at a microphone and a playback audio signal provided to a speaker. The technique continues by synchronizing the playback audio signal with the captured audio signal to generate a synchronized audio signal and transforming the synchronized audio signal to a first subband representation and the captured audio signal to a second subband representation. The technique then includes calculating a transfer function associated with the speaker and the microphone based on the first subband representation and the second subband representation.

The disclosed embodiments provide a technological improvement in that an audio system may provide neutral audio reproduction and may work properly independently of the audio source material and the amount of background noise.

1. In some embodiments, a method comprises receiving a first audio signal captured at a microphone and a second audio signal provided to a speaker, synchronizing the second audio signal with the first audio signal to generate a synchronized audio signal, transforming the synchronized audio signal to a first subband representation and the first audio signal to a second subband representation, and calculating a transfer function associated with the speaker and the microphone based on the first subband representation and the second subband representation.

2. The method of clause 1, where synchronizing the second audio signal comprises determining a delay between the first audio signal and the second audio signal, and processing the second audio signal based on the delay to generate the synchronized audio signal.

3. The method of clause 1 or 2, where the first subband representation comprises a first set of spectral bands and the second subband representation comprises a second set of spectral bands that correspond respectively to the first set of spectral bands, and further comprising calculating a coherence for each pair of corresponding spectral bands of the first set of spectral bands and the second set of spectral bands.

4. The method of any of clauses 1-3, further comprising updating, based at least in part on the coherence, a first partial transfer function associated with a first spectral band of the first subband representation and the second subband representation.

5. The method of any of clauses 1-4, further comprising measuring acoustic background noise, wherein updating the partial transfer functions is performed at a rate that is based, at least in part, on a comparison between one or more bands of the first subband representation and the acoustic background noise.

6. The method of any of clauses 1-5, where updating is further based on a smoothing factor that depends, at least in part, on the coherence.

7. The method of any of clauses 1-6, where a functional relation between the smoothing factor and the coherence is based, at least in part, on psycho-acoustic parameters.

8. The method of any of clauses 1-7, where the second audio signal provided to the speaker is filtered based at least in part on the transfer function.

9. The method of any of clauses 1-8, further comprising deriving an equalization filter based at least in part on the transfer function, and applying the equalization filter to the second audio signal.

10. The method of any of clauses 1-9, where the first subband representation comprises a first set of spectral bands and the second subband representation comprises a second set of spectral bands that correspond respectively to the first set of spectral bands, and wherein calculating the transfer function further comprises calculating a partial transfer function for each pair of corresponding spectral bands of the first and second set of spectral bands.

11. The method of any of clauses 1-10, where calculating the transfer function comprises determining a signal to noise ratio for an audio signal with respect to audio noise, estimating a transfer function between a speaker and a microphone based, at least in part, on two previous transfer functions between the speaker and the microphone, and, in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio.

12. The method of any of clauses 1-11, where the rate of the iterative process increases when the signal to noise ratio increases and the rate of the iterative process decreases when the signal to noise ratio decreases.

13. The method of any of clauses 1-12, further comprising calculating a coherence between each spectral band of the first and the second subband representations, wherein the rate of the iterative process of updating the estimate of the transfer function further depends, at least in part, on the coherence.

14. The method of any of clauses 1-13, wherein the microphone and the speaker are included in a system configured for augmented reality or virtual reality, wherein the system further includes a display source.

15. In some embodiments, a non-transitory computer readable medium stores instructions that, when executed by a processor, cause the processor to perform the steps of receiving a first audio signal captured at a microphone and a second audio signal provided to a speaker, synchronizing the second audio signal with the first audio signal to generate a synchronized audio signal, transforming the synchronized audio signal to a first subband representation and the first audio signal to a second subband representation, and calculating a transfer function associated with the speaker and the microphone based on the first subband representation and the second subband representation.

16. The non-transitory computer readable medium of clause 15, where the first subband representation comprises a first set of spectral bands and the second subband representation comprises a second set of spectral bands that correspond respectively to the first set of spectral bands, and further comprising calculating a coherence for each pair of corresponding spectral bands of the first set of spectral bands and the second set of spectral bands.

17. The non-transitory computer readable medium of clause 15 or 16, further comprising updating, based at least in part on the coherence, a first partial transfer function associated with a first spectral band of the first subband representation and the second subband representation.

18. The non-transitory computer readable medium of any of clauses 15-17, where calculating the transfer function comprises determining a signal to noise ratio for an audio signal with respect to audio noise, estimating a transfer function between a speaker and a microphone based, at least in part, on two previous transfer functions between the speaker and the microphone, and in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio.

19. The non-transitory computer readable medium of any of clauses 15-18, wherein the rate of the iterative process increases when the signal to noise ratio increases and the rate of the iterative process decreases when the signal to noise ratio decreases.

20. In some embodiments, a system comprises a calibration module that receives a first audio signal captured at a microphone and a second audio signal provided to a speaker, synchronizes the second audio signal with the first audio signal to generate a synchronized audio signal, transforms the synchronized audio signal to a first subband representation and the first audio signal to a second subband representation, and calculates a transfer function associated with the speaker and the microphone based on the first subband representation and the second subband representation.

21. The system of clause 20, where the calibration module calculates the transfer function by determining a signal to noise ratio for an audio signal with respect to audio noise, estimating a transfer function between a speaker and a microphone based, at least in part, on two previous transfer functions between the speaker and the microphone, and, in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio, where the rate of the iterative process increases when the signal to noise ratio increases and the rate of the iterative process decreases when the signal to noise ratio decreases.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   receiving a first audio signal captured at a microphone and a second audio signal provided to a speaker;
   synchronizing the second audio signal with the first audio signal to generate a synchronized audio signal;
   transforming the synchronized audio signal to a first subband representation and the first audio signal to a second subband representation; and
   calculating a transfer function associated with the speaker and the microphone based on the first subband representation, the second subband representation, wherein a rate of updating the transfer function is based on a coherence between at least a portion of the first subband representation and at least a portion of the second subband representation.

2. The method of claim 1, wherein synchronizing the second audio signal comprises:
   determining a delay between the first audio signal and the second audio signal; and
   processing the second audio signal based on the delay to generate the synchronized audio signal.

3. The method of claim 1, wherein the first subband representation comprises a first set of spectral bands and the second subband representation comprises a second set of spectral bands that correspond respectively to the first set of spectral bands, and further comprising calculating a coherence for each pair of corresponding spectral bands of the first set of spectral bands and the second set of spectral bands.

4. The method of claim 3, further comprising updating, based at least in part on the coherence, a first partial transfer function associated with a first spectral band of the first subband representation and the second subband representation.

5. The method of claim 4, further comprising:
   measuring acoustic background noise, wherein updating the partial transfer functions is performed at a rate that is based, at least in part, on a comparison between one or more bands of the first subband representation and the acoustic background noise.

6. The method of claim 4, wherein updating is further based on a smoothing factor that depends, at least in part, on the coherence.

7. The method of claim 6, wherein a functional relation between the smoothing factor and the coherence is based, at least in part, on psycho-acoustic parameters.

8. The method of claim 1, wherein the second audio signal provided to the speaker is filtered based at least in part on the transfer function.

9. The method of claim 1, further comprising:
   deriving an equalization filter based at least in part on the transfer function; and
   applying the equalization filter to the second audio signal.

10. The method of claim 1, wherein the first subband representation comprises a first set of spectral bands and the second subband representation comprises a second set of spectral bands that correspond respectively to the first set of spectral bands, and wherein calculating the transfer function further comprises calculating a partial transfer function for each pair of corresponding spectral bands of the first and second set of spectral bands.

11. The method of claim 1, wherein calculating the transfer function comprises:
   determining a signal to noise ratio for an audio signal with respect to audio noise;
   estimating a transfer function between a speaker and a microphone based, at least in part, on two previous transfer functions between the speaker and the microphone; and
   in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio.

12. The method of claim 11, wherein the rate of the iterative process increases when the signal to noise ratio increases and the rate of the iterative process decreases when the signal to noise ratio decreases.

13. The method of claim 11, further comprising calculating a coherence between each spectral band of the first and the second subband representations, wherein the rate of the iterative process of updating the estimate of the transfer function further depends, at least in part, on the coherence.

14. The method of claim 1, wherein the microphone and the speaker are included in a system configured for augmented reality or virtual reality, wherein the system further includes a display source.

15. A non-transitory computer readable medium storing instructions that, when executed by a processor, cause the processor to perform the steps of:

receiving a first audio signal captured at a microphone and a second audio signal provided to a speaker;

synchronizing the second audio signal with the first audio signal to generate a synchronized audio signal;

transforming the synchronized audio signal to a first subband representation and the first audio signal to a second subband representation; and calculating a transfer function associated with the speaker and the microphone based on the first subband representation, the second subband representation, wherein a rate of updating the transfer function is based on a coherence between at least a portion of the first subband representation and at least a portion of the second subband representation.

16. The non-transitory computer readable medium of claim 15, wherein the first subband representation comprises a first set of spectral bands and the second subband representation comprises a second set of spectral bands that correspond respectively to the first set of spectral bands, and further comprising calculating a coherence for each pair of corresponding spectral bands of the first set of spectral bands and the second set of spectral bands.

17. The non-transitory computer readable medium of claim 16, further comprising updating, based at least in part on the coherence, a first partial transfer function associated with a first spectral band of the first subband representation and the second subband representation.

18. The non-transitory computer readable medium of claim 16, wherein calculating the transfer function comprises:

determining a signal to noise ratio for an audio signal with respect to audio noise;

estimating a transfer function between a speaker and a microphone based, at least in part, on two previous transfer functions between the speaker and the microphone; and in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio.

19. The non-transitory computer readable medium of claim 18, wherein the rate of the iterative process increases when the signal to noise ratio increases and the rate of the iterative process decreases when the signal to noise ratio decreases.

20. A system, comprising:

a calibration module that:

receives a first audio signal captured at a microphone and a second audio signal provided to a speaker, synchronizes the second audio signal with the first audio signal to generate a synchronized audio signal, transforms the synchronized audio signal to a first subband representation and the first audio signal to a second subband representation, and calculates a transfer function associated with the speaker and the microphone based on the first subband representation, the second subband representation, wherein a rate of updating the transfer function is based on a coherence between at least a portion of the first subband representation and at least a portion of the second subband representation.

21. The system of claim 20, wherein the calibration module calculates the transfer function by:

determining a signal to noise ratio for an audio signal with respect to audio noise;

estimating a transfer function between a speaker and a microphone based, at least in part, on two previous transfer functions between the speaker and the microphone; and in an iterative process, updating an estimate of the transfer function between the speaker and the microphone based, at least in part, on another two previous transfer functions between the speaker and the microphone, wherein a rate of the iterative process of updating the estimate of the transfer function depends, at least in part, on the signal to noise ratio, wherein the rate of the iterative process increases when the signal to noise ratio increases and the rate of the iterative process decreases when the signal to noise ratio decreases.

22. The method of claim 1, wherein the rate of updating the transfer function is inversely proportional to a magnitude of the coherence.

23. The method of claim 1, wherein the transfer function and the coherence are unique to a first spectral band of a plurality of spectral bands of the first subband representation and the second subband representation.

* * * * *